(12) United States Patent
Psaila

(10) Patent No.: US 9,354,338 B1
(45) Date of Patent: May 31, 2016

(54) GENERATING SYNTHETIC SEISMIC TRACES

(71) Applicant: WESTERNGECO L.L.C., Houston, TX (US)

(72) Inventor: David E. Psaila, Ealing (GB)

(73) Assignee: WESTERNGECO L.L.C., Houston, TX (US)

( * ) Notice: Subject to any disclaimer, the term of this patent is extended or adjusted under 35 U.S.C. 154(b) by 458 days.

(21) Appl. No.: 13/744,063

(22) Filed: Jan. 17, 2013

Related U.S. Application Data

(60) Provisional application No. 61/601,968, filed on Feb. 22, 2012.

(51) Int. Cl.
*G01V 1/28* (2006.01)

(52) U.S. Cl.
CPC ..................... *G01V 1/282* (2013.01)

(58) Field of Classification Search
CPC ........................................... G01V 1/00
USPC ......................... 367/73; 702/12–14
See application file for complete search history.

(56) References Cited

U.S. PATENT DOCUMENTS

| | | | |
|---|---|---|---|
| 4,953,142 A * | 8/1990 | Rimmer .................. | 367/73 |
| 6,018,497 A | 1/2000 | Gunasekera | |
| 6,438,069 B1 | 8/2002 | Ross et al. | |
| 7,082,367 B2 | 7/2006 | Bankhead et al. | |
| 7,337,070 B2 | 2/2008 | Lecerf | |
| 7,453,767 B1 | 11/2008 | Padgett | |
| 7,925,481 B2 | 4/2011 | van Wagoner et al. | |
| 2002/0013661 A1 | 1/2002 | van Riel et al. | |
| 2002/0053430 A1 | 5/2002 | Curtis et al. | |
| 2006/0136162 A1 * | 6/2006 | Hamman et al. .............. | 702/104 |
| 2011/0015912 A1 | 1/2011 | Oppert et al. | |
| 2011/0054857 A1 | 3/2011 | Moguchaya | |

FOREIGN PATENT DOCUMENTS

WO 2011059535 5/2011

OTHER PUBLICATIONS

Al-Najjar et al., "SPE 56730: 4D Seismic Modellling of the Statfjord Field: Initial Results," SPE International, 1999: pp. 1-8.
Doyen, "Chapter 7.5: Computation of 4-D Synthetics," Seismic Reservoir Characterization: An Earth Modelling Perspective, Education Tour Series, EAGE Publications, 2007: pp. 220-222.
Gawith et al., "Seismic validation of reservoir simulation using a shared earth model," Petroleum Geoscience, 1996, vol. 2: pp. 97-103.

* cited by examiner

*Primary Examiner* — Luke Ratcliffe

(57) ABSTRACT

A method for generating synthetic seismic traces. The method includes receiving a hybrid model that includes geological and seismic data, where the geological data corresponds to a zone of interest and the seismic data corresponds to the zone of interest and adjacent areas of the zone of interest. The method may determine a plurality of reflection properties along a path for a trace location using data from the hybrid model. The method may then generate a synthetic seismic trace for the trace location using the plurality of reflection properties.

21 Claims, 16 Drawing Sheets

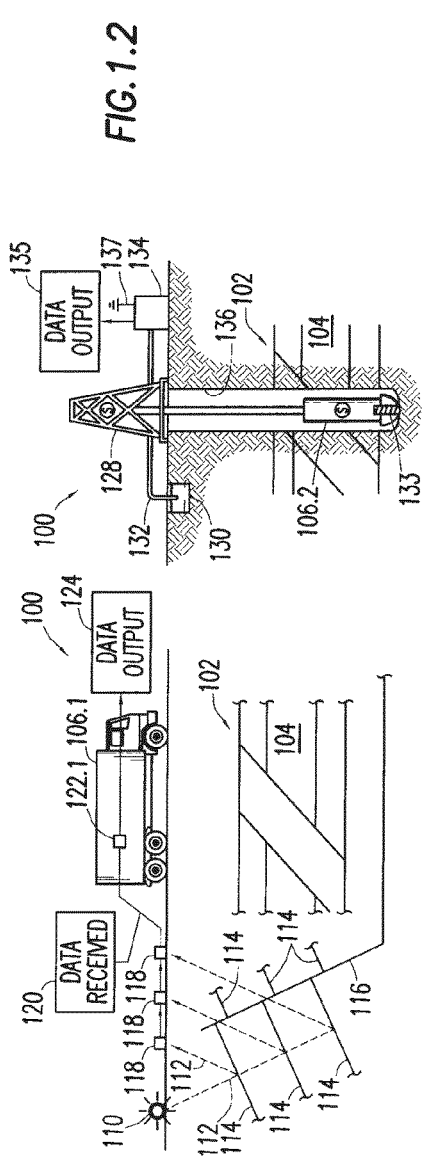
FIG. 1.1
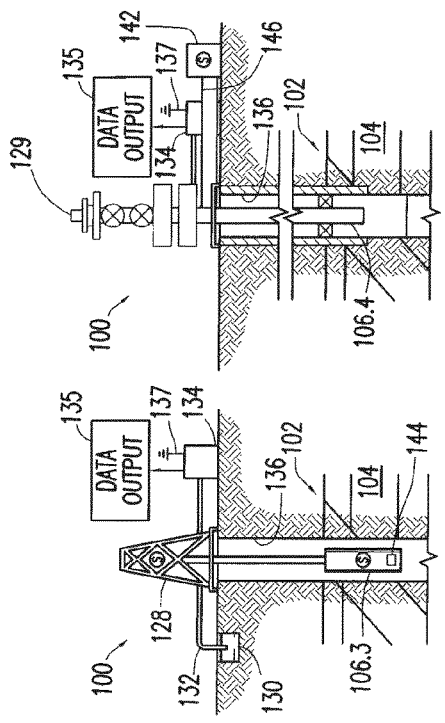
FIG. 1.2
FIG. 1.3
FIG. 1.4

GENERATING SYNTHETIC SEISMIC TRACES

CROSS-REFERENCE TO RELATED APPLICATIONS

This application claims the benefit of U.S. Provisional Patent Application Ser. No. 61/601,968 filed Feb. 22, 2012, which is incorporated herein by reference in its entirety.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Seismic surveying generally includes the process of recording reflected seismic waves from beneath the subsurface in order to model geological structures and physical properties of the earth. For instance, the aim of a seismic survey may be to depict the physical properties of a reservoir. However, a secondary process may be used in conjunction with modeling where we validate the same models that seismology tries to create. By synthesizing seismic data from seismic or geological models, recorded seismic survey data can be compared to this synthetic seismic data. Doing so allows geophysicists to verify the accuracy of subsurface models as well as fine tune actual surveys.

In addition to seismic models, another type of modeling involves using geological data to construct a geological model of the earth's subsurface. Both seismic and geological models describe similar structures within the earth, but each are constructed using data from different sources with different strengths and limitations. While seismic data may include amplitude traces recorded at hydrophones and geophones, geological models often use lithological or rock data as the basis for constructing features in the subsurface. The actual recorded geological data can then be used to extrapolate and interpolate physical regions throughout the subsurface. However, as is the case with seismic models, geological models need to be validated for accuracy as well. If the synthetic or interpolated data is wrong or inaccurate, the model loses much of its value.

SUMMARY

Described herein are implementations of various technologies for a method, which includes receiving a hybrid model that includes geological and seismic data, where the geological data corresponds to a zone of interest and the seismic data corresponds to the zone of interest and adjacent areas of the zone of interest. The method may determine a plurality of reflection properties along a path for a trace location using data from the hybrid model. The method may then generate a synthetic seismic trace for the trace location using the plurality of reflection properties.

In another implementation, the seismic data may include regularly sampled data and the geological data may include irregularly sampled data. The hybrid model may also include elastic property values of physical media in the zone of interest and in the adjacent areas of the zone of interest. The geological data may include structural and stratigraphic features of the zone of interest. The seismic data may also include seismic survey data, synthetic seismic data, data derived from the recorded seismic survey data, or a combination thereof. The path for the trace location may be based on a predetermined angle of incidence at which a seismic wave approaches a reflection interface along the path. The method may also include validating the synthetic seismic trace with recorded seismic survey data for the trace location.

In a further implementation, the method may include determining the plurality of reflection properties by determining a reflection coefficient at a reflection interface using data from the hybrid model. The hybrid model may also include elastic property values from the geological data and the seismic data, and reflection coefficients may be determined using only the geological data to determine an elastic property value of an interface medium at the reflection interface. The geological data may also take priority over the seismic data to determine an elastic property of an interface medium at the reflection interface.

In yet another implementation, the method may include repeating the determining step and the generating step for a plurality of trace locations to generate a plurality of synthetic seismic traces. The method may also include validating the plurality of synthetic seismic traces with recorded seismic survey data that corresponds to the plurality of trace locations. The plurality of trace locations may be defined by inline locations, crossline locations, or both. The plurality of synthetic seismic traces may also be defined by a predetermined slice range.

In still another implementation, the method may include generating the synthetic seismic trace by modeling a portion of the synthetic seismic trace in the time domain by performing a convolution of reflection coefficients based on the geological data with a wavelet. The method may also include generating the synthetic seismic trace by modeling a portion of the synthetic seismic trace in the frequency domain by performing a convolution of reflection coefficients based on the seismic data with a wavelet.

In some implementations, a computing system is provided, and includes means for receiving a hybrid model that includes geological and seismic data, where the geological data corresponds to a zone of interest and the seismic data corresponds to the zone of interest and adjacent areas of the zone of interest. The computing system may also have means for determining a plurality of reflection properties along a path for a trace location using data from the hybrid model. The computing system may also have means for generating a synthetic seismic trace for the trace location using the plurality of reflection properties.

In some implementations, an information processing apparatus for use in a computing system is provided, and includes means for receiving a hybrid model that includes geological and seismic data, where the geological data corresponds to a zone of interest and the seismic data corresponds to the zone of interest and adjacent areas of the zone of interest. The information processing apparatus may also have means for determining a plurality of reflection properties along a path for a trace location using data from the hybrid model. The information processing apparatus may also have means for generating a synthetic seismic trace for the trace location using the plurality of reflection properties.

In some implementations, a computing system is provided that includes at least one processor, at least one memory, and one or more programs stored in the at least one memory, wherein the programs include instructions, which when executed by the at least one processor cause the computing system to receive a hybrid model that includes geological and seismic data, where the geological data corresponds to a zone of interest and the seismic data corresponds to the zone of interest and adjacent areas of the zone of interest. The programs may further include instructions to cause the computing system to determine a plurality of reflection properties along a path for a trace location using data from the hybrid model. The programs may further include instructions to cause the computing system to generate a synthetic seismic trace for the trace location using the plurality of reflection properties.

In some implementations, a computer readable storage medium is provided, which has stored therein one or more computer-executable instructions, which when executed by a processor, cause the processor to receive a hybrid model that includes geological and seismic data, where the geological data corresponds to a zone of interest and the seismic data corresponds to the zone of interest and adjacent areas of the zone of interest. The computer readable storage medium may further include instructions, which cause the processor to determine a plurality of reflection properties along a path for a trace location using data from the hybrid model. The computer readable storage medium may also include instructions, which cause the processor to generate a synthetic seismic trace for the trace location using the plurality of reflection properties.

Described herein are implementations of various technologies for a method, which includes receiving a first hybrid model that includes a first set of geological data and a first set of seismic data. The first set of geological data may correspond to a zone of interest, while the second set of seismic data may correspond to the zone of interest and adjacent areas of the zone of interest. The method may also include receiving a second hybrid model that includes a second set of geological data and a second set of seismic data. The second set of geological data may correspond to the zone of interest, while the second set of seismic data may correspond to the zone of interest and the adjacent areas of the zone of interest, where at least one of the second set of geological data is time-lapse data of the first set of geological data and the second set of seismic data is time-lapse data of the first set of seismic data. The method may include determining a first plurality of reflection properties along a first path for a trace location using data from the first hybrid model. The method may then include determining a second plurality of reflection properties along a second path for the trace location using data from the second hybrid model. The method may generate a first synthetic seismic trace for the trace location using the first plurality of reflection properties. The method may then generate a second synthetic seismic trace for the trace location using the second plurality of reflection properties. The method may also determine the difference between the first synthetic seismic trace and the second synthetic seismic trace.

In some implementations, a computing system is provided, and includes means for receiving a first hybrid model that includes a first set of geological data and a first set of seismic data. The first set of geological data may correspond to a zone of interest, while the second set of seismic data may correspond to the zone of interest and adjacent areas of the zone of interest. The computing system may also have means for receiving a second hybrid model that includes a second set of geological data and a second set of seismic data. The second set of geological data may correspond to the zone of interest, while the second set of seismic data may correspond to the zone of interest and the adjacent areas of the zone of interest, where at least one of the second set of geological data is time-lapse data of the first set of geological data and the second set of seismic data is time-lapse data of the first set of seismic data. The computing system may also have means for determining a first plurality of reflection properties along a first path for a trace location using data from the first hybrid model. The computing system may also have means for determining a second plurality of reflection properties along a second path for the trace location using data from the second hybrid model. The computing system may also have means for generating a first synthetic seismic trace for the trace location using the first plurality of reflection properties. The computing system may also have means for generating a second synthetic seismic trace for the trace location using the second plurality of reflection properties. The computing system may also have means for determining the difference between the first synthetic seismic trace and the second synthetic seismic trace.

In some implementations, an information processing apparatus for use in a computing system is provided, and includes means for receiving a first hybrid model that includes a first set of geological data and a first set of seismic data. The first set of geological data may correspond to a zone of interest, while the second set of seismic data may correspond to the zone of interest and adjacent areas of the zone of interest. The information processing apparatus may also have means for receiving a second hybrid model that includes a second set of geological data and a second set of seismic data. The second set of geological data may correspond to the zone of interest, while the second set of seismic data may correspond to the zone of interest and the adjacent areas of the zone of interest, where at least one of the second set of geological data is time-lapse data of the first set of geological data and the second set of seismic data is time-lapse data of the first set of seismic data. The information processing apparatus may also have means for determining a first plurality of reflection properties along a first path for a trace location using data from the first hybrid model. The information processing apparatus may also have means for determining a second plurality of reflection properties along a second path for the trace location using data from the second hybrid model. The information processing apparatus may also have means for generating a first synthetic seismic trace for the trace location using the first plurality of reflection properties. The information processing apparatus may also have means for generating a second synthetic seismic trace for the trace location using the second plurality of reflection properties. The information processing apparatus may also have means for determining the difference between the first synthetic seismic trace and the second synthetic seismic trace.

In some implementations, a computing system is provided that includes at least one processor, at least one memory, and one or more programs stored in the at least one memory, wherein the programs include instructions, which when executed by the at least one processor cause the computing system to receive a first hybrid model that includes a first set of geological data and a first set of seismic data. The first set of geological data may correspond to a zone of interest, while the second set of seismic data may correspond to the zone of interest and adjacent areas of the zone of interest. The programs may further include instructions to cause the computing system to receive a second hybrid model that includes a second set of geological data and a second set of seismic data. The second set of geological data may correspond to the zone of interest, while the second set of seismic data may correspond to the zone of interest and the adjacent areas of the zone of interest, where at least one of the second set of geological data is time-lapse data of the first set of geological data and the second set of seismic data is time-lapse data of the first set of seismic data. The programs may further include instructions to cause the computing system to determine a first plurality of reflection properties along a first path for a trace location using data from the first hybrid model. The programs may further include instructions to cause the computing system to determine a second plurality of reflection properties along a second path for the trace location using data from the second hybrid model. The programs may further include instructions to cause the computing system to generate a first synthetic seismic trace for the trace location using the first plurality of reflection properties. The programs may further include instructions to cause the computing system to generate a second synthetic seismic trace for the trace location using the second plurality of reflection properties. The programs may also include instructions to cause the computing system to determine the difference between the first synthetic seismic trace and the second synthetic seismic trace.

In some implementations, a computer readable storage medium is provided, which has stored therein one or more computer-executable instructions, which when executed by a processor, cause the processor to receive a first hybrid model that includes a first set of geological data and a first set of seismic data. The first set of geological data may correspond to a zone of interest, while the second set of seismic data may correspond to the zone of interest and adjacent areas of the zone of interest. The computer readable storage medium may further include instructions, which cause the processor to receive a second hybrid model that includes a second set of geological data and a second set of seismic data. The second set of geological data may correspond to the zone of interest, while the second set of seismic data may correspond to the zone of interest and the adjacent areas of the zone of interest, where at least one of the second set of geological data is time-lapse data of the first set of geological data and the second set of seismic data is time-lapse data of the first set of seismic data. The computer readable storage medium may further include instructions, which cause the processor to determine a first plurality of reflection properties along a first path for a trace location using data from the first hybrid model. The computer readable storage medium may further include instructions, which cause the processor to determine a second plurality of reflection properties along a second path for the trace location using data from the second hybrid model. The computer readable storage medium may further include instructions, which cause the processor to generate a first synthetic seismic trace for the trace location using the first plurality of reflection properties. The computer readable storage medium may further include instructions, which cause the processor to generate a second synthetic seismic trace for the trace location using the second plurality of reflection properties. The computer readable storage medium may further include instructions, which cause the processor to determine the difference between the first synthetic seismic trace and the second synthetic seismic trace.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIGS. 1.1-1.4 illustrate simplified, schematic views of an oilfield and its operation in accordance with various implementations described herein.

DETAILED DESCRIPTION

Figure 2:
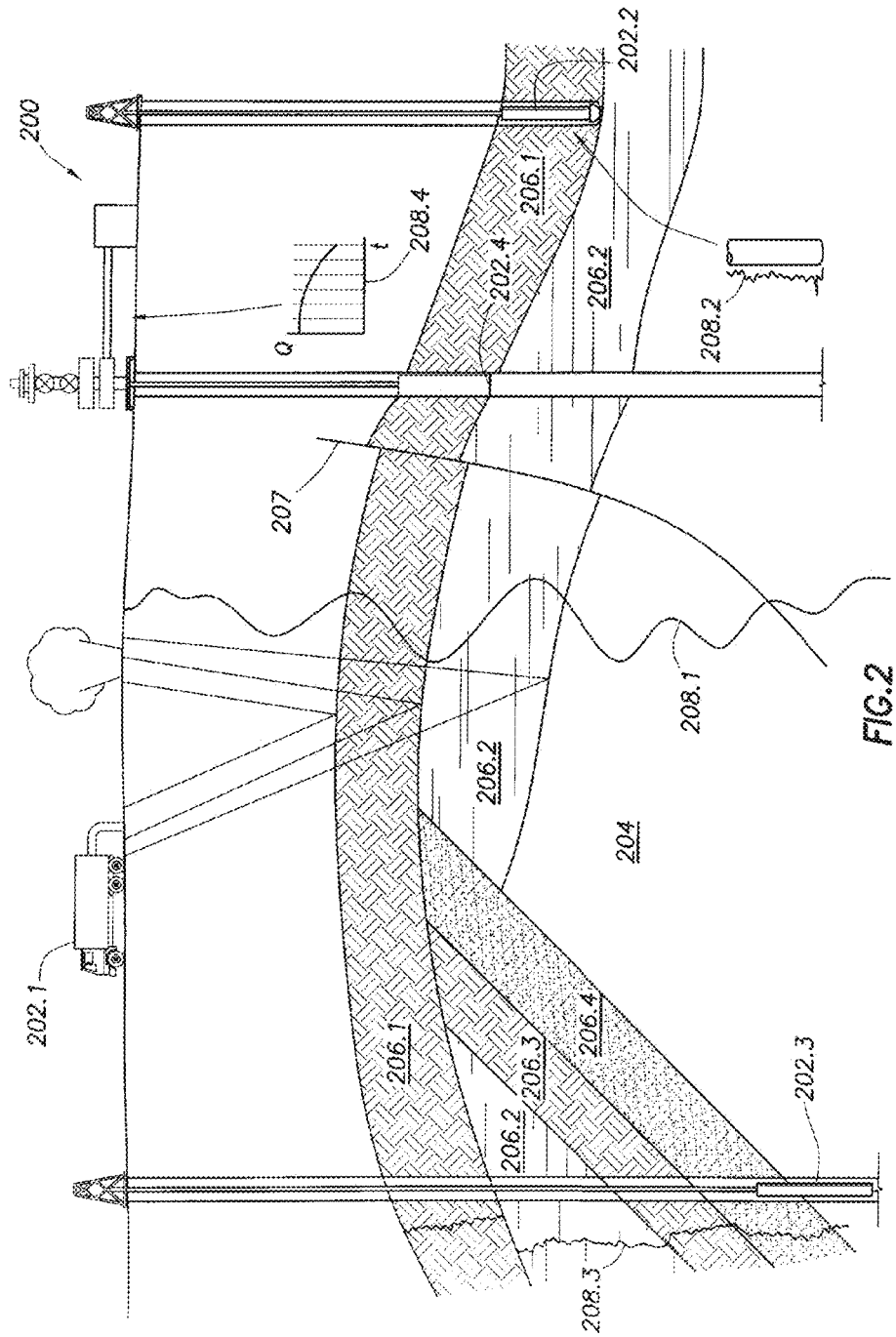
FIG. 2 illustrates a schematic view, partially in cross section of an oilfield having a plurality of data acquisition tools positioned at various locations along the oilfield for collecting data from the subterranean formations in accordance with various implementations described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

Various techniques described herein are implemented with reference to an oil field operation. As such, before describing implementations of these techniques, it may be useful to describe a suitable oil field operation that may benefit from the various techniques described herein.

As used herein, the terms "up" and "down;" "upper" and "lower;" "upwardly" and "downwardly;" "below" and "above;" and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

Introduction to Oilfield Environment

FIGS. 1.1-1.4 illustrate simplified, schematic views of oilfield 100 having subterranean formation 102 containing reservoir 104 therein in accordance with implementations of various technologies and techniques described herein. FIG. 1.1 illustrates a survey operation being performed by a survey tool, such as seismic truck 106.1, to measure properties of the subterranean formation. The survey operation is a seismic survey operation for producing sound vibrations. In FIG. 1.1, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1.2 illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is usually filtered and returned to the mud pit. A circulating system may be used for storing, controlling or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 illustrates a wireline operation being performed by wireline tool 106.3 suspended by rig 128 and into wellbore 136 of FIG. 1.2. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1.4 illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1.2-1.4 illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 are intended to provide a brief description of an example of a field usable with oilfield application frameworks. Part, or all, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1.1-1.4, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3:
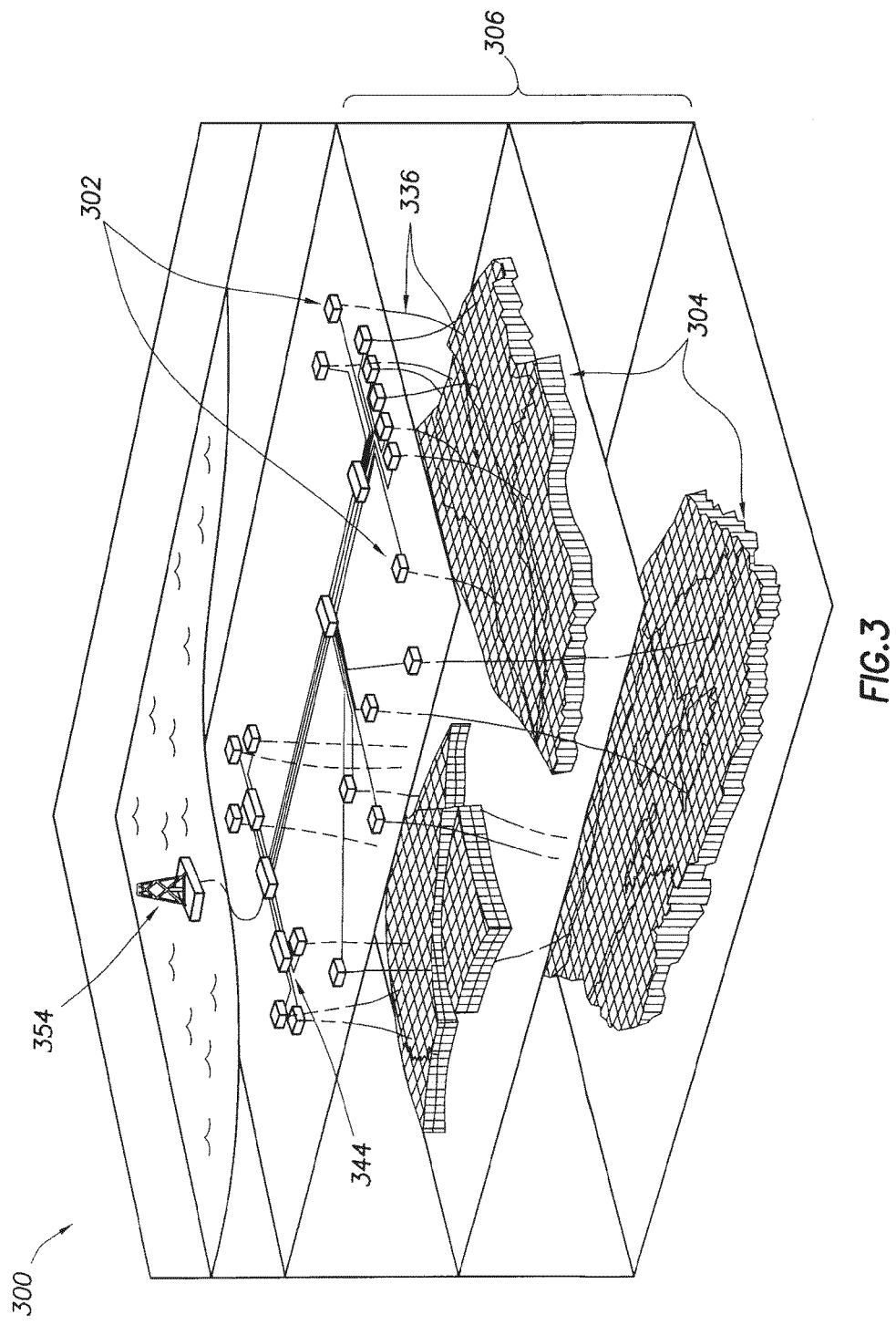
FIG. 3 illustrates a production system for performing one or more oilfield operations in accordance with implementations of various technologies and techniques described herein.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Generating Synthetic Seismic Traces from a Hybrid Model

The following paragraphs generally describe one or more implementations of various techniques directed to generating synthetic seismic traces from a hybrid elastic property model using seismic and geological data. A seismogram or seismic trace is the recorded or synthetic response of seismic waves, especially from within the earth's subsurface. In regard to terminology, seismogram, synthetic trace, synthetic seismic trace, seismogram trace and seismic trace may be used interchangeably.

Modeling seismic and geological data begins with data acquisition and consolidation. Data is taken from a variety of available sources and placed into a geographic information system (GIS) or another type of database for storing, manipulating, analyzing, presenting and processing data. Depending on the source, the data may be synthetic or recorded data. In one instance, a database may store data in cells, where each cell might correspond to a physical region of the model along a spatial grid. Cells may be uniform or irregular, with each cell representing a finite area or volume with predetermined dimensions.

For presenting data, software may provide a visual presentation of seismic and geological data sets. For a 1-D or 2-D data set, pixels may be used. For a 3-D data set, voxels may be utilized, where a voxel is a volumetric pixel or volumetric picture element. Pixels or voxels may correspond to one or several cells in a data set. For example, a displayed voxel may represent or contain elastic property information for a specified region of space on a spatial grid. Each voxel may be uniform and represent equal-sized regions of space, or the voxels may have discrete spatial dimensions causing each voxel to have a unique shape. For 4-D data, dynamic voxels may be used instead of regular voxels.

For seismic data, collected data may be stored in a data set called a seismic volume, where each cell in the seismic volume may represent a fixed quantity of area or space. In a 3D data set, each cell in a seismic volume may describe the physical properties for a predetermined cubic unit, such as a physical region that is 12 meters by 12 meters by 12 meters, or, in another example, a cell representing 12.5 meters by 12.5 meters laterally and 4 milliseconds vertically. The dimensions represented by cells in a data set may vary between data sets. A seismic survey with regular spacing between receivers and measurements at regular sampling intervals may produce a seismic volume with regularly spaced cells on a spatial grid.

In contrast, geological model data sets may include cells that do not describe physical regions with uniform physical dimensions. Depending on how and where the data is collected, geological data may be sampled at irregular intervals as well as receive information from a variety of different sources. One source of geological data may include measurements taken from a borehole during drilling. This borehole data may then be used to determine structural and stratigraphic data throughout a geological zone of interest. A geological zone of interest may be a reservoir or some physical region represented by a geological model. Data for physical regions outside the borehole may be obtained through interpolation and extrapolation techniques relying on a geological understanding of rock formations and stratigraphy. Likewise, well logs may provide a valuable source for geological model data.

Despite the various differences between seismic and geological model data sets, there are circumstances where one data type may prove useful in conjunction or in addition to the other data type. For example, synthetic seismic data sets may be generated from geological models. These synthetic data sets may be used to validate static reservoir models as well as contribute to the interpretation of time-lapse seismic data.

One such example of using geological models to generate synthetic seismic traces involves resampling data onto a regular seismic grid. However, there are challenges associated with this approach. One issue is that the geological model grid may not be congruent with the output seismic grid. The output seismic grid has a regular lateral spacing between traces whereas the geological model grid may have irregular lateral variation of voxel sizes. Conversely, geological model grids may have an irregular vertical variation of voxel sizes, such as when grid layers pinch out, resulting in the corresponding voxels collapsing to zero thickness. The regular seismic grid may not capture such features. As a result of these considerations, synthetic seismic traces may be computed after a resampling operation has been performed to transfer the geological model properties into the output seismic grid. However, the resampling process may not be able to adequately represent the fine scale features of the geological model in the seismic grid, and the resulting synthetic seismic traces may not honor the geological model.

Additionally, information about the distribution of elastic properties in the overburden and underburden may be incorporated in the synthetic modeling process. Without this information, it may not be possible to accurately model the synthetic seismic response around the top and base of the geological model. This is because reflecting interfaces that lie within the overburden and underburden can influence portions of the synthetic seismic trace that fall within the reservoir zone. Likewise, the top and base of the geological model are also reflecting interfaces that may be incorporated, where their reflection coefficients may be computed with knowledge of the elastic properties adjacent to the interfaces. In these cases, combining elastic properties defined in the geological model with properties defined in the overburden or underburden may allow such computation.

Furthermore, one application of both seismic and geological modeling is to analyze and utilize elastic property information for calculating media attributes and reflection properties. A database may include elastic property information in parameterized data for isotropic elastic media. For example, one set of parameters regarding a medium may be P-velocity (Vp), S-velocity (Vs) and density. However, alternative parameterizations of the elastic property information may be used in addition or instead of the (Vp, Vs, density) parameter set, such as the following parameterizations: (acoustic impedance, Poisson's ratio and density), (acoustic impedance, Vp/Vs, density), (acoustic impedance, shear impedance, density), some combination of these enumerated parameters, or another applicable parameterization set. Brief definitions of these elastic property information parameters are included here:

P-velocity (Vp) is the velocity of a primary or pressure wave traversing a medium.

S-velocity (Vs) is the velocity of a secondary or shear wave traversing the medium.

Density of a medium is the mass per unit of volume of the medium.

Acoustic impedance (Z) is the product of density and seismic velocity of a pressure wave through a medium.

Shear impedance (Zs) is the product of density and the velocity of a shear wave through a medium.

Poisson's ratio is the negative ratio of transverse strain to axial strain.

From elastic property information, several seismic facies parameters or reflection-related properties can be calculated for the media interfaces. Examples of seismic facies parameters include reflection configurations, reflection continuities, reflection amplitudes, reflection frequencies, interval velocities and external reflection geometries for seismic facies units.

Reflection configurations may be determined from bedding patterns, depositional processes, erosion and paleotopography. Reflection configuration examples include reflection patterns such as parallel, onlap, divergent, downlap, toplap, erosional truncation, oblique, sigmoidal, wedge, lens-shape, fan-shaped and other configurations.

Reflection continuity relates to the continuity of strata. Reflection continuity information may be determined from bedding continuity and depositional processes.

Reflection amplitudes are determined from contrasts in elastic property information such as density and velocity information for specific media interfaces. Changes in reflection amplitudes may be represented in the form of reflection coefficients. For seismic volumes and geological models, reflection coefficients may be calculated by the differences or contrasts in elastic property values of physical media between two adjacent cells in the path of a propagating wave, such as from contrasts in densities or media velocities. Bed spacing and fluid content may also used to determine reflection amplitudes.

Reflection frequency may be determined using bed thickness and fluid content.

Interval velocity may be determined from estimations of lithology, estimations of porosity and fluid content.

In modeling reflected seismic waves, reflection coefficients for a reflective interface are based on the angle of incidence and the elastic properties above and below the reflective interface, where the reflection coefficients may determine the amplitude and other characteristics of the reflected wave. The angle of incidence is the angle in which a propagating wave approaches a media interface. For a seismic survey, the angle of incidence refers to the angle at which a seismic wave approaches a reflective interface. The angle may be a function of shot and receiver offsets in the survey. Depending on the location of a seismic source, the acoustic waves produced by the source may approach a reflection interface at a particular angle of incidence, and this particular angle may determine what direction a trace location receives any reflected acoustic waves from the source's acoustic waves. To calculate the reflection coefficients, Zoeppritz equations or other approximations may be used to obtain their values from the elastic property information of the various media.

One or more implementations of various techniques for generating synthetic seismic traces or sub-volumes of synthetic seismic traces will now be described in more detail with reference to FIGS. 4-14 in the following paragraphs.

Figure 4:
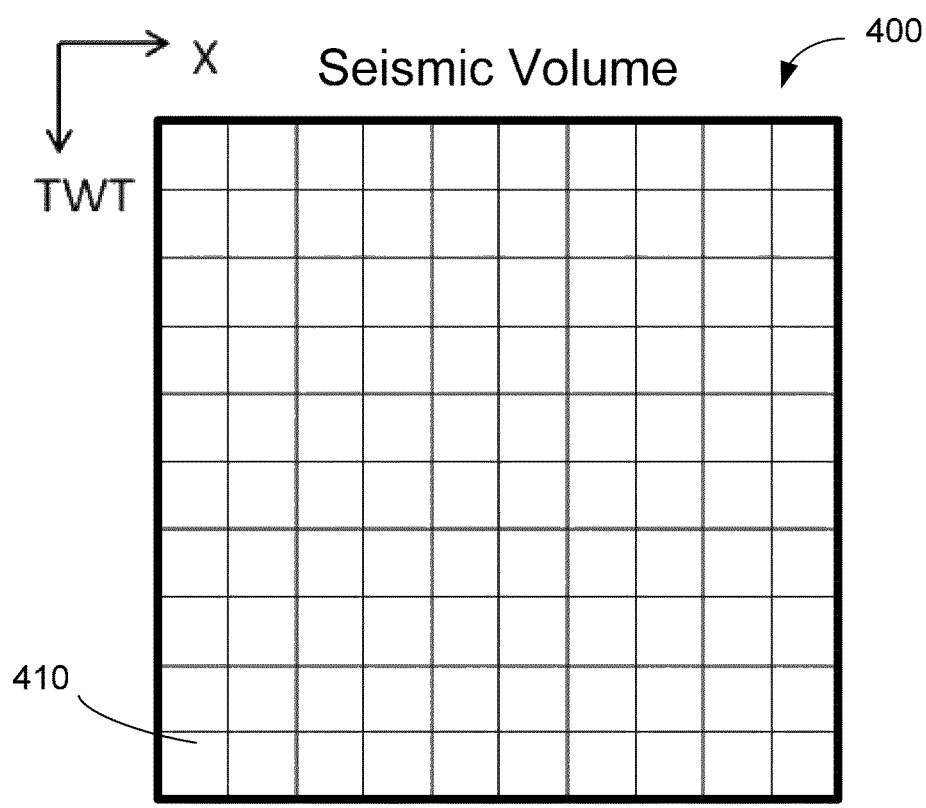
FIG. 4 illustrates a seismic volume in accordance with various implementations described herein.

FIG. 4 illustrates a seismic volume 400 in accordance with implementations of various technologies described herein. The seismic volume 400 includes data defined on a regular Cartesian grid throughout the entire model volume, where a seismic cell 410 or voxel forms one unit in the grid. This cell 410 shares the same dimensions as the other cells in the seismic volume 400, and may contain elastic property information, such as data corresponding to (Vp, Vs, density) parameters or another parameterization. The elastic property values may be treated as constant throughout the entire cell, but other implementations may exist where the parameter values correspond to ranges or other data types. Where the seismic volume is used to store elastic property information, it may also be called a seismic property model.

Because the data within a given seismic volume is a function of many seismic survey considerations, the resulting seismic volume 400 may have particular attributes specific to that seismic volume 400. Where seismic survey data is collected at regularly spaced intervals, the data set may correspond to a regular spaced Cartesian grid or mesh, as demonstrated by the seismic volume 400 in FIG. 4, but other implementations are contemplated. In regard to the seismic volume 400, the vertical axis displays the two-way travel time (TWT) domain, illustrating the amount of time an acoustic wave travels from a source to a reflection interface to produce a reflected wave and the amount of time the reflected wave takes to return to a seismic receiver at a trace location. The horizontal axis depicts the distance between recorded seismic traces in a survey.

The seismic volume 400 may contain raw data recorded during seismic surveys, synthetic seismic data, or data derived from synthetic or seismic survey data. Raw seismic data may be seismic amplitude data for specific trace times. For derived seismic data, the seismic volume may include transformed data sets. One data transformation process is seismic inversion, where raw seismic data undergoes data interpretation processes to obtain geological depth information and may include producing a seismic inversion property model. As such, the seismic volume 400 may also be referred to as seismic inversion property model.

Seismic inversion encompasses many different seismic data processes, which may be done pre- or post-stack, deterministically, randomly or using geostatistical methods. Seismic inversion involves converting or transforming raw data into data sets that describe or model the geological subsurface structures and stratigraphy. The science behind seismic inversion is that a recorded seismic trace can be modeled as the convolution of a wavelet and a reflection coefficient series with noise added in. Equation (1) demonstrates this relationship:

$$S(t)=R(t)*w(t)+n(t) \qquad \text{Eq. 1}$$

where S(t) is the seismic trace as a function of reflection time, R(t) is the reflection coefficient series, w(t) is the wavelet, n(t) is noise, and * is the convolution operator.

Since recorded survey data depends on the angle of incidence, the data within a seismic volume may be designated for specific seismic trace angles of incidence. For instance, a seismic volume may be assigned a specific angle of incidence value or a range of incidence angle values. One seismic volume may be for seismic traces with incidence angles from 0 to 5 degrees. Another seismic volume may be for seismic traces with incidence angles from 6 to 12 degrees, but many different implementations are contemplated. The range of incidence angles may be defined by survey designs and other characteristics, such as shot or source spacing.

Figure 5:
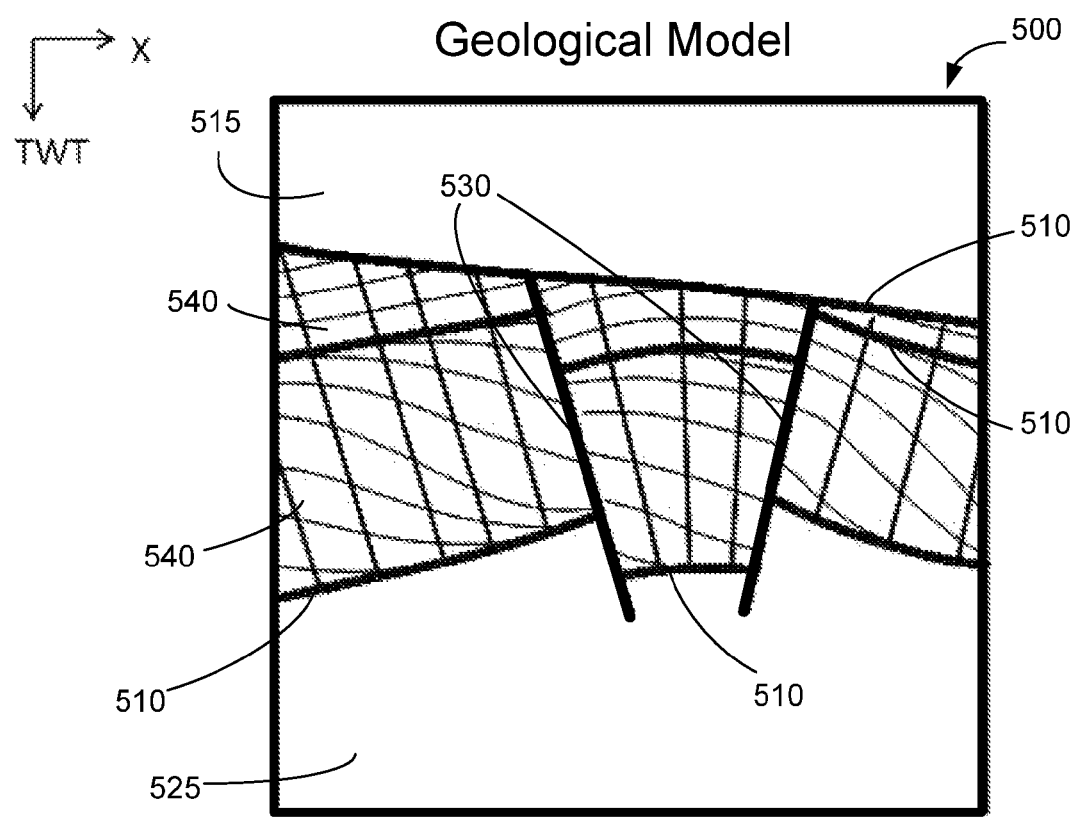
FIG. 5 illustrates a geological model in accordance with various implementations described herein.

FIG. 5 illustrates a geological model 500 in accordance with implementations of various technologies described herein. Geological models may include spatial and physical property data for rocks and other materials within a geological zone of interest. Similar to the cells in the seismic volume 400, each cell in the geological model 500 may contain information about a particular physical region. This information may include elastic property information, such as the data used for calculating reflection coefficients at media interfaces that may be defined within irregularly shaped hexahedral cells or voxels within an irregularly spaced geological model mesh 540. The elastic property information correspond to a (Vp, Vs, density) parameter set or another parameterization.

In contrast to other model types, geological models may carry detailed knowledge of the structural and stratigraphic features of a geologic zone of interest such as a reservoir formation. For example, structural features may include faults, dips, igneous intrusions, relict weathering surfaces, dissolution fronts, diagenetic alteration fronts, and other features. For stratigraphic features, these may include rock types, layer thickness, geological facies, and other features.

One example of a geological zone of interest may be a particular reservoir. As shown in the geological model 500, the geological zone of interest encompasses several geological layers between an overburden 515 and an underburden 525. The overburden 515 and the underburden 525 may contain regions outside the geological zone of interest where the data is undefined for those regions. Other geological structures may be illustrated in the geological model 500, such as faults 530 and stratal surfaces 510.

Keeping with FIG. 5, the geological model 500 includes a curvilinear geological model mesh 540 of cells. Cells within the geological model mesh may vary in size and geometry, and may pinch out from the strata surfaces 510. Because the geological model 500 data is not obtained at regular intervals throughout the geological zone of interest like the seismic volume 400, the geological model 500 data may be distributed irregularly.

Figure 6:
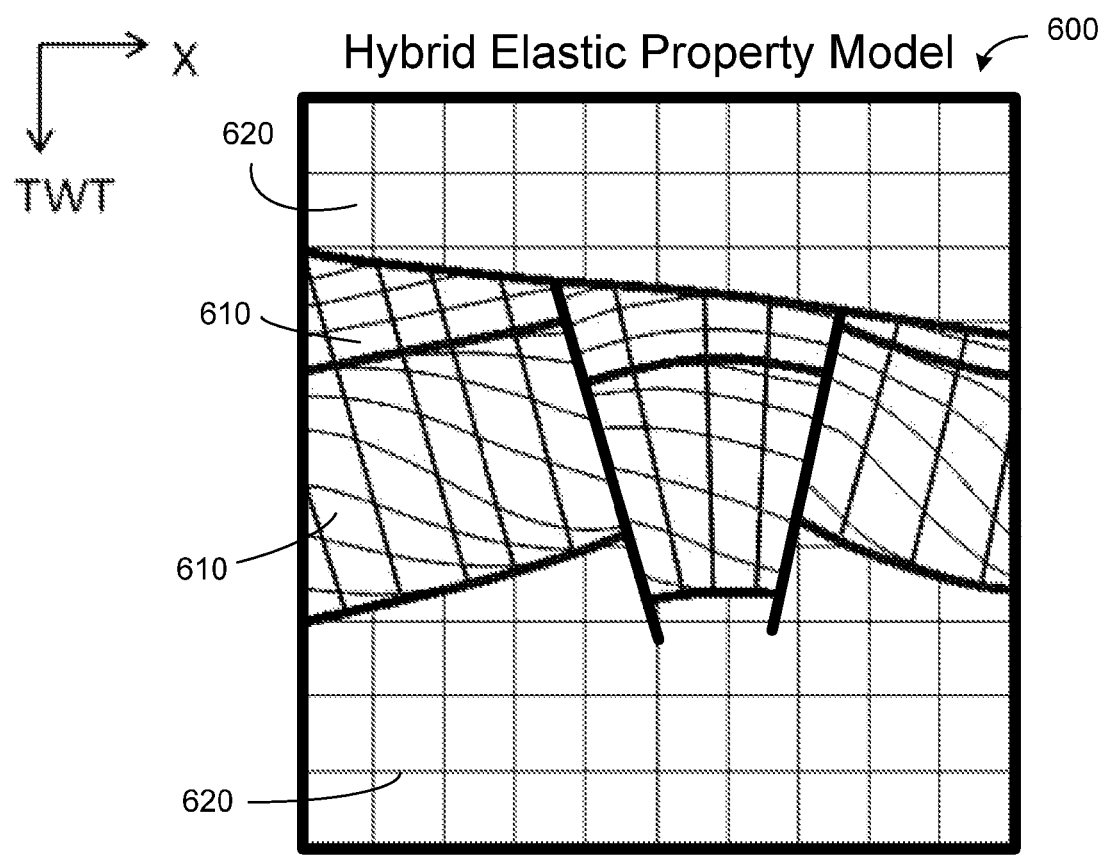
FIG. 6 illustrates a hybrid model in accordance with various implementations described herein.

FIG. 6 illustrates a hybrid elastic property model 600 in accordance with implementations of various technologies described herein. The hybrid elastic property model (HEPM) 600 includes a composite of data from both the seismic volume 400 and the geological model 500.

Similar to the seismic volume 400 and the geological model 500, the hybrid elastic property model 600 may contain elastic property information. As illustrated in FIG. 6, data 620 from the seismic volume 400 corresponds to a regular seismic grid and takes a background to data 610 from the geological model 500. The HEPM's 600 regions that correspond to the geological zone of interest from FIG. 5 match the irregularly shaped hexahedral cells from the curvilinear geological model mesh 540. For purposes of the HEPM 600, the geological model's 500 data 610 takes priority over the data 620 from the seismic volume 400. For the overburden 515 and the underburden 525 in the HEPM 600, the data for cells corresponds to the elastic property information of the regularly spaced cells in the seismic volume 400 in FIG. 4, because the geological model 500 has no such information for those regions. Together, the seismic volume 400 and geological model 500 define the spatial distribution of elastic properties both within the geological zone of interest and the adjacent overburden 515 and underburden 525. In one implementation, where the geological zone of interest of the geological model 500 has incomplete or missing cells, data 620 from the seismic volume 400 may be used to populate cells within the geological zone of interest in the HEPM 600.

Figure 7:
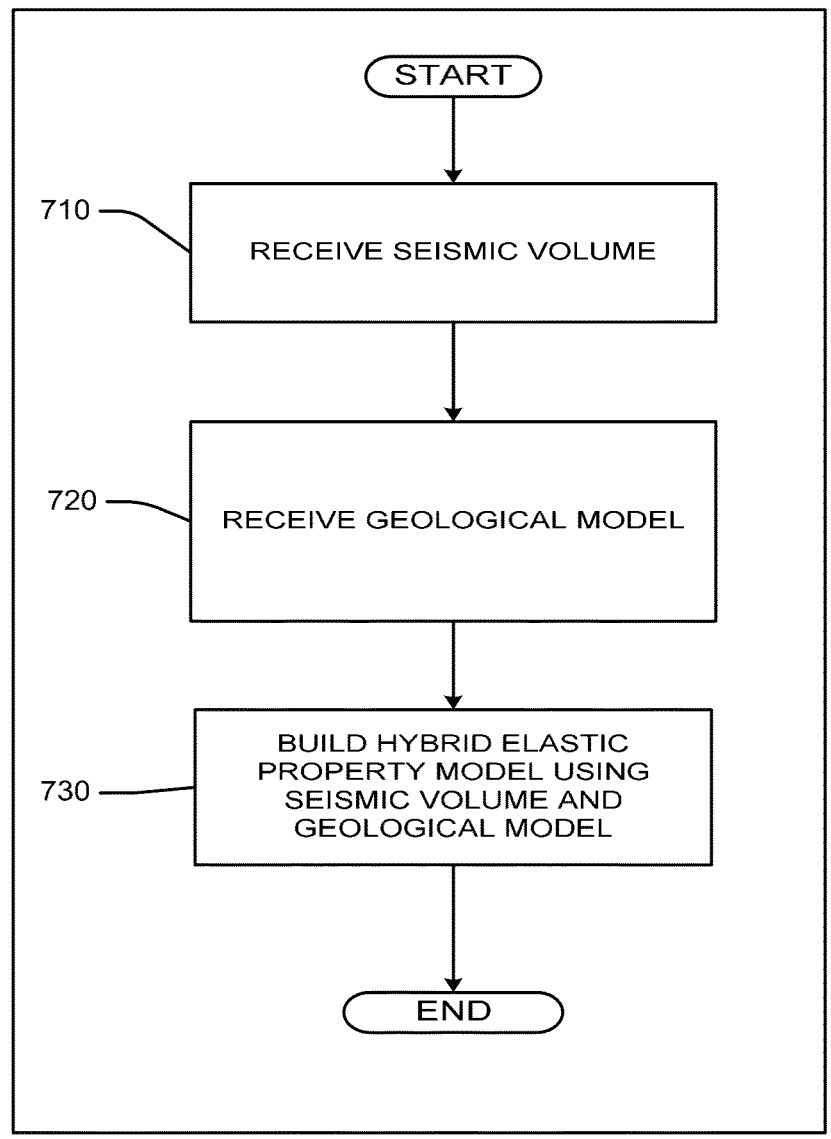
FIG. 7 illustrates a flow diagram of a method for generating a hybrid elastic property model in accordance with various implementations described herein.

FIG. 7 illustrates a flow diagram of a method for generating a hybrid elastic property model in accordance with various implementations described herein. It should be understood that while the operational flow diagram indicates a particular order of execution of the operations, in other implementations, the operations might be executed in a different order. Further, in some implementations, additional operations or steps may be added to the method. Likewise, some operations or steps may be omitted.

At step 710, the seismic volume 400 is received from any available source. This seismic volume 400 may be the product of seismic inversion or another transformation process or simply raw seismic data. The seismic volume 400 data may include elastic property information and be organized according to a particular elastic property information parameterization. Also, the seismic volume 400 in step 710 may not necessarily be an entire seismic data set and may be only certain seismic data or property information.

At step 720, the geological model 500 is received from any available source. The geological model 500 may include elastic property information or raw data.

At step 730, data from the seismic volume 400 is combined with data from the geological model 500 to build the hybrid elastic property model 600. Where the data from either the seismic volume 400 or the geological model 500 utilizes raw data, the data may be transformed into representing elastic property information in this step. The HEPM 600 may also be organized into an elastic property information parameterization, which is the same as either the seismic volume 400 or geological model 500, or a different parameterization from either data set.

Figure 8:
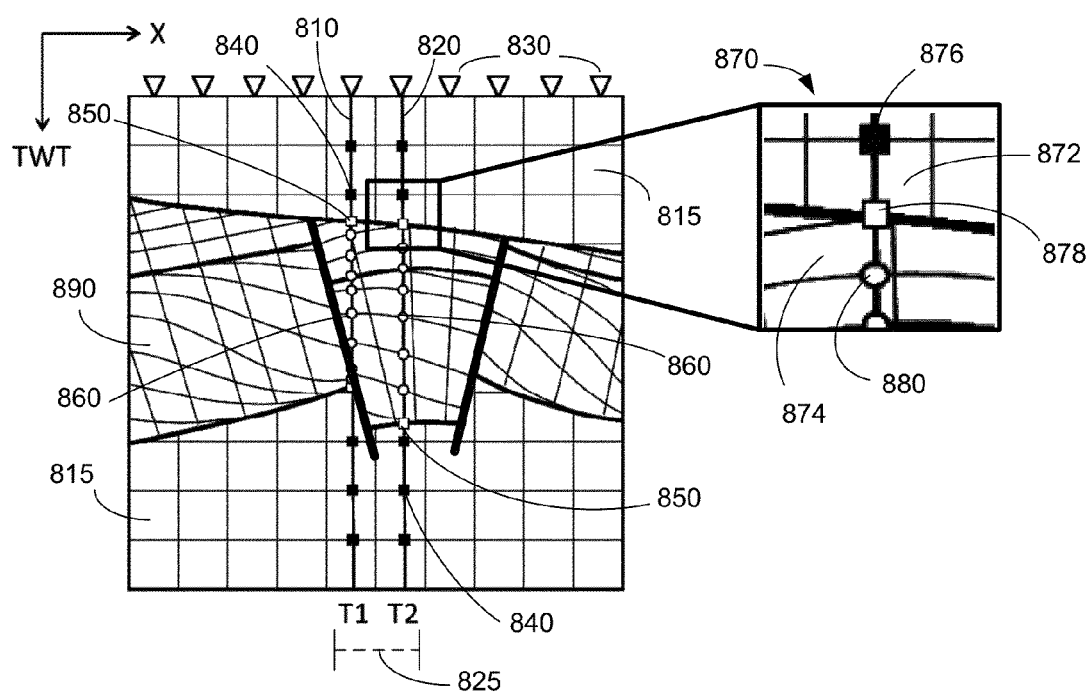
FIG. 8 illustrates a cross-sectional view of a seismic sub-volume within a hybrid elastic property model.

FIG. 8 illustrates a seismic sub-volume 825 of trace locations 830 within the HEPM 600 in accordance with implementations of various technologies described herein. The seismic sub-volume 825 is an area of interest, which may be defined to cover part, or all, of the hybrid elastic property model 600 and may specify which seismic traces (and their corresponding reflection interfaces) are of interest. For example, in determining the seismic sub-volume 825, a user may select a limited inline, crossline and/or slice range of trace locations 830 for synthetic analysis. Inline and crossline positions describe relative trace locations, while slice describes seismic trace data points for a seismic sub-volume at a particular point or interval in time (e.g., 100 ms). If only a portion of a seismic trace at a trace location is desired, slice may be used to determine this portion of the seismic trace. Calculating the corresponding physical position of trace locations for a seismic survey may take into account the spatial coordinates of a receiver for a particular trace location. A smaller seismic sub-volume allows for less computation time in producing all the synthetic seismic traces within the chosen ranges. However, the seismic sub-volume 825 could be set to include every trace location at every slice of time in the hybrid elastic property model 800.

As shown in FIG. 8, trace locations 830 of seismic waves cover the top of the HEPM 600. A trace location may represent a receiver, such as a geophone or hydrophone, in a seismic survey. For each trace location, a path corresponds to a geometric trace beneath the subsurface, such as a vertical line passing underneath a trace location. For instance, the seismic sub-volume 825 encompasses two paths: a path 810 for the T1 trace location and a path 820 for the T2 trace location. The paths 810 and 820 intersect reflection interfaces in the HEPM 600.

The position of reflection interfaces within the seismic sub-volume 825 are located using an intersection operation, where the intersection operation takes elastic property information from the HEPM 600 along paths designated for seismic traces. For a given seismic trace, the position of a reflection interface is determined in the seismic two-way time domain by the intersection operation. The reflection interfaces are not cells or voxels, but the border between two adjacent cells or voxels. The contrast between media velocities and material densities between two adjacent cells determines the reflection properties, such as reflection coefficients, at a particular reflection interface. Black boxes 840 represent the position of a reflection interface in the HEPM's 600 region using data from the seismic volume 400. Unfilled circles 860 represent the position of a reflection interface in the HEPM's 600 region data from the geological model 500. Unfilled squares 850 represent reflection interfaces on the border between the seismic volume data 815 and geological model data 890. For determining the velocity/density contrast of the unfilled squares 850, the seismic volume data 815 and the geological model data 890 may be used.

Keeping with FIG. 8, a magnified view 870 shows the interlocking of cells in the hybrid elastic property model 600 and their corresponding reflection interfaces. For instance, a seismic volume cell 872 provides data for one medium of an unfilled box reflection interface 878, while a geological model cell 874 provides data for the other medium of the unfilled box reflection interface 878. In regard to the filled box reflection interface 876, data for both media is from the seismic volume 400. Conversely, the unfilled circle reflection interface 880 is surrounded by cells with data from the geological model 500.

Figure 9A:
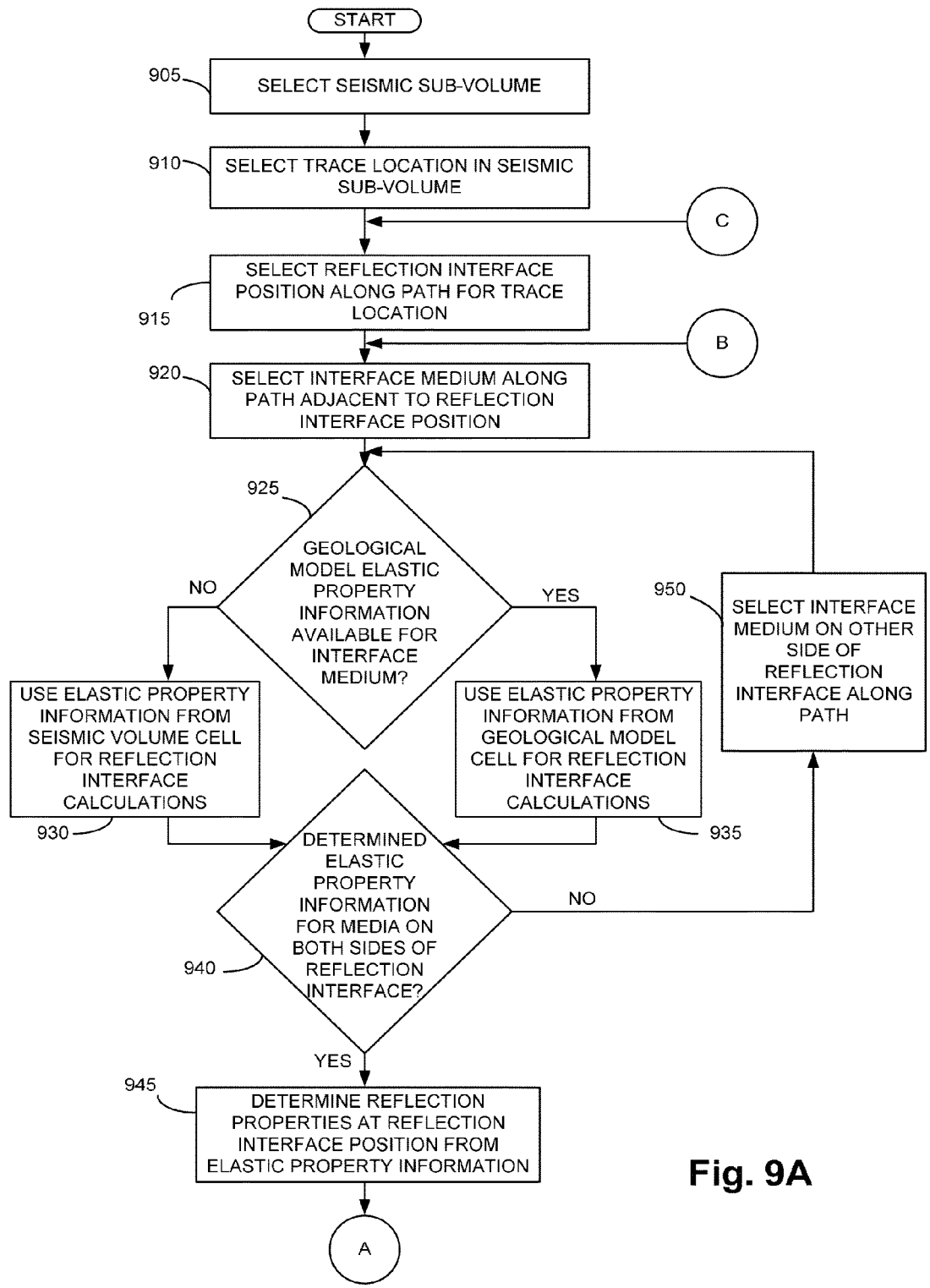
FIGS. 9A-9B illustrate a flow diagram of a method for generating reflection properties for reflection interfaces in a seismic sub-volume from a hybrid elastic property model in accordance with various implementations described herein.
Figure 9B:
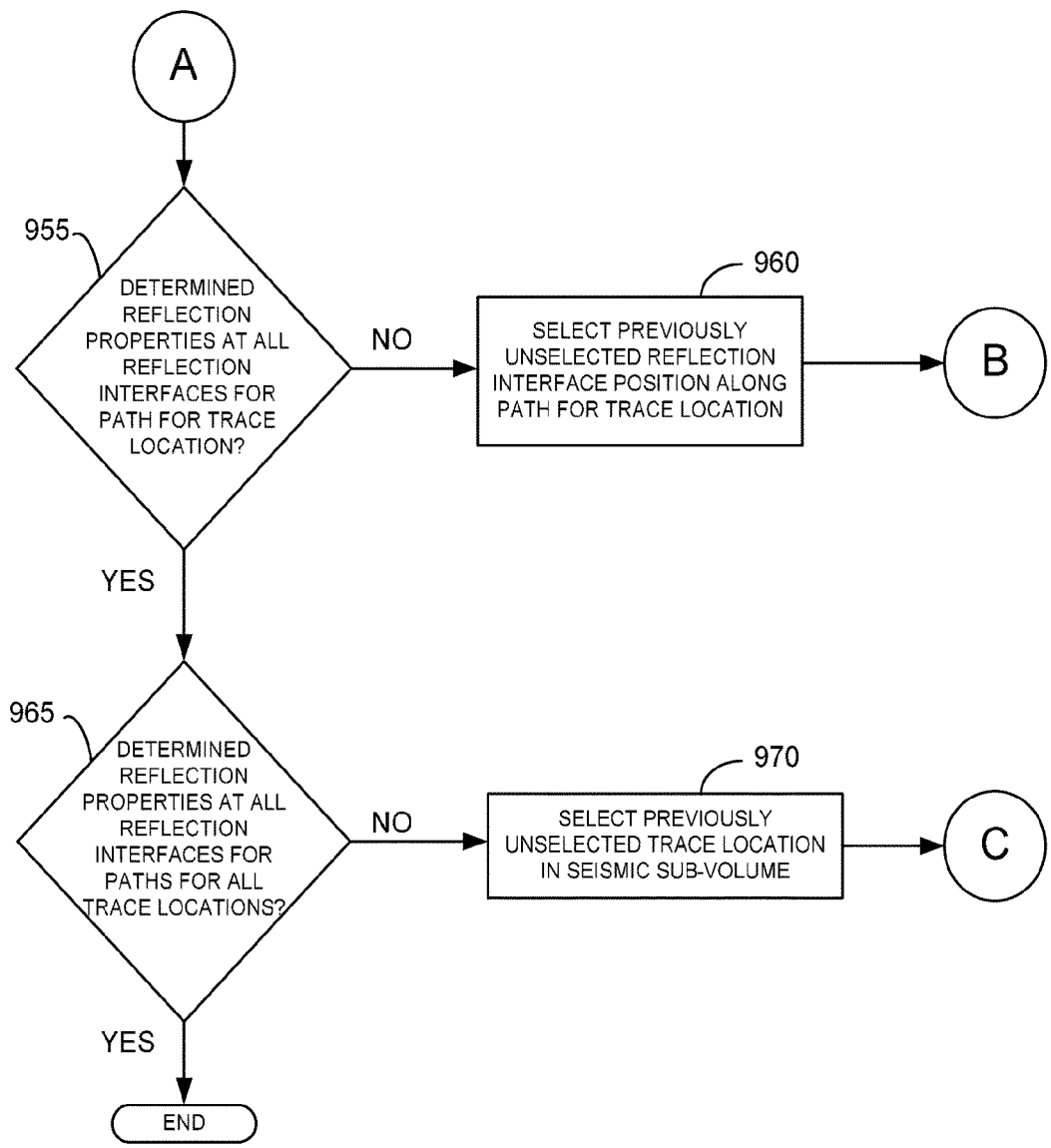

FIGS. 9A-9B illustrate a flow diagram of a method for determining elastic property information for a seismic sub-volume in accordance with various implementations described herein. It should be understood that while the operational flow diagram indicates a particular order of execution of the operations, in other implementations, the operations might be executed in a different order. Further, in some implementations, additional operations or steps may be added to the method. Likewise, some operations or steps may be omitted.

At step 905, the seismic sub-volume 825 is selected. This seismic sub-volume 825 may define a "probe" onto which computed synthetic seismic traces will be painted. In one implementation, the user may interactively manipulate the "probe" by resizing it and/or moving it within the space defined by the hybrid elastic property model 600. The synthetic seismic traces may be recomputed interactively when the user manipulates the probe or when the user edits other parameters that control the synthetic generation. Examples of these parameters may include the angle of incidence used in the reflection coefficient calculation or the wavelet used in the convolutional modeling. The result of modifying these parameters may be an immediate recalculation and redisplay of the synthetic seismic trace. Where the seismic sub-volume is of a limited size, the recalculation of the synthetic seismic trace may be performed at near interactive speeds or real time.

At step 910, a trace location in the chosen seismic sub-volume 825 is selected.

At step 915, a reflection interface position along a path for the chosen trace location is selected. As illustrated in FIG. 8, the reflection interface position may be the unfilled boxes, the unfilled circles or the filled boxes. A reflection interface position may be where two cells meet in the hybrid elastic property model 600. The border between two cells is the reflection interface and the reflection interface position is where a path meets the reflection interface.

At step 920, an interface medium along the path adjacent to the chosen reflection interface position is selected. An interface medium is one of two media that form a reflection interface. For example, the chosen reflection interface position may be an unfilled box reflection interface 878 inside the magnified view 870 of the seismic sub-volume 825, where the unfilled box reflection interface 878 lies between a seismic volume cell 872 and a geological model cell 874. In this instance, the seismic volume cell 872 represents one interface medium, while the geological model cell 874 represents another interface medium.

At step 925, a determination is made whether geological model elastic property information is available for the chosen medium interface. For example, in FIG. 8, a black box reflection interface 876 from the magnified view 870 is surrounded by cells from the seismic volume 400. Therefore, no geological model elastic property information is available for the interface medium above or below the black box reflection interface 876. For an unfilled circle reflection interface 880, the cells representing both interface media are from the geological model 500. Therefore, geological model elastic property information is available for either interface media. On the other hand, the interface media of an unfilled box reflection interface 878 uses elastic property information from both the seismic volume 400 and the geological model 500. For the top interface medium of the unfilled box reflection interface 878, there is only a seismic volume cell 872 so elastic property information from the seismic volume 400 is used. For the bottom interface medium of the unfilled box reflection interface 878, there is a geological model cell 874, so elastic property information from the geological model 500 may be used, even though seismic volume cells run underneath the geological model cell 874.

In calculating reflection properties, geological model data takes priority over seismic volume data. If there is geological model elastic property information for a particular interface medium, the process proceeds to step 935. Otherwise, the process proceeds to step 930. At step 930, the elastic property information from the seismic volume's cells for the chosen interface medium is used for reflection interface calculations.

At step 935, the elastic property information from geological model's cells for the chosen medium is used for reflection interface calculations.

At step 940, a determination is made as to whether elastic property information is obtained for media on both sides of the reflection interface. If elastic property information is obtained for both sides, then the process proceeds to step 945. Otherwise, the process proceeds to step 950. For example, in regard to the unfilled box reflection interface 878, once elastic property information is obtained from the seismic volume cell 872 and the geological model cell 874, the process may proceed to step 945. If only elastic property information from one of the two cells has been obtained, the process goes to step 950 to select the interface medium corresponding to the other cell.

At step 945, the reflection properties at the reflection interface position may be determined from the elastic property information acquired in either step 930 or step 935. For example, reflection coefficients may be determined for the reflection interface based on the previously obtained elastic property information. In lieu of, or in addition to the reflection coefficients, other reflection properties, such as reflection configurations or other seismic facies parameters, may be determined.

At step 950, the interface medium on the other side of the reflection interface along the path from the previously chosen medium is selected and the process continues back to step 925.

At step 955, a determination is made whether reflection properties at all reflection interfaces for the path for the chosen trace location have been obtained. If so, the process proceeds to step 965. If not, the process proceeds to step 960. In some implementations, less than all reflection properties or less than all reflection interfaces may be included in this determination.

At step 960, a previously unselected reflection interface position along the path for the chosen trace location is selected. The process then proceeds to step 920.

At step 965, a determination is made whether reflection properties at all reflection interfaces for paths for all trace locations have been obtained. If so, the process proceeds to end. If not, the process proceeds to step 970. In some implementations, less than all reflection properties or less than all reflection interfaces may be included in this determination.

At step 970, a previously unselected trace location in the seismic sub-volume is selected and the process continues back to step 915. For example, if trace location T1 has only been selected previously, trace location T2 may now be selected.

In steps 905-970, the manner of selecting the seismic sub-volume, the trace locations, the reflection interface positions or the interface media may be unimportant. The manner may be done randomly, iteratively or by any other method.

Figure 10:
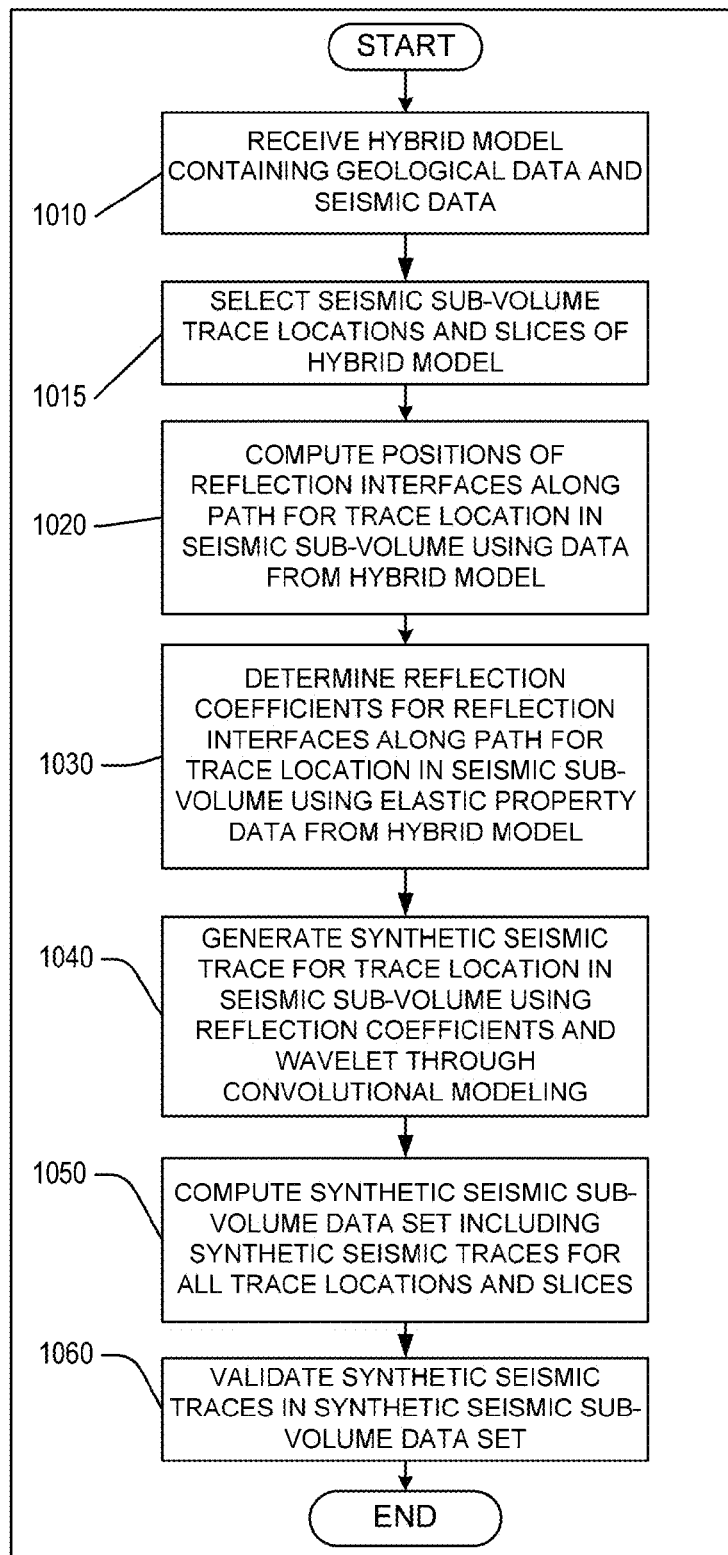
FIG. 10 illustrates a flow diagram of a method for generating a synthetic seismic sub-volume in accordance with various implementations described herein.

FIG. 10 illustrates a flow diagram of a method for generating a synthetic seismic sub-volume data set in accordance with various implementations described herein. It should be understood that while the operational flow diagram indicates a particular order of execution of the operations, in other implementations, the operations might be executed in a different order. Further, in some implementations, additional operations or steps may be added to the method. Likewise, some operations or steps may be omitted.

At step 1010, the hybrid model containing geological and seismic data is received. For example, the hybrid model may be the hybrid elastic property model 600 built from elastic property data of the seismic volume 400 and elastic property data from the geological model 500, though other hybrid models are envisioned as well. The seismic data may be from a regularly sampled data set, while the geological data may be from an irregularly sampled data set. See FIGS. 6 and 7 and the related discussion on building the hybrid elastic property model 600.

At step 1015, seismic sub-volume trace locations and slices of the hybrid model are selected. The seismic sub-volume 825 may be defined by inline and crossline coordinates of trace locations and for predetermined slice ranges, where the coordinates and slice ranges correspond to data within the hybrid model. See FIG. 8 and step 905 for a detailed description on determining the seismic sub-volume 825, and the trace locations and slices within the seismic sub-volume.

At step 1020, the positions of reflection interfaces along a path 1105 for a trace location in the seismic sub-volume are computed using data from the hybrid model. See FIGS. 8 and 11 and the related discussion on how an intersection operation computes the position of reflection interfaces along a path. Examples of the calculated positions of reflection interfaces are illustrated as the filled boxes, unfilled boxes and unfilled circles in FIG. 11. At step 1030, reflection coefficients for reflection interfaces along the path 1105 for a trace location are determined using elastic property data from the hybrid model. Where there is geological data and seismic data for a particular interface medium at a reflection interface, the elastic property of the interface medium may be determined from the geological data. See FIGS. 9A-9B for calculating reflection coefficients or other reflection properties for reflection interfaces throughout the seismic sub-volume 825. An example of the determined reflection coefficients as positive and negative pulses is illustrated in FIG. 12. Besides reflection coefficients, other seismic facies parameters or reflection-related properties may be determined from the hybrid model such as reflection continuities or interval velocities.

At step 1040, a synthetic seismic trace is generated using reflection coefficients and a wavelet through convolutional modeling. In one implementation, only a portion of a synthetic seismic trace may be generated, which corresponds to a predetermined slice range. In another implementation, a synthetic seismic trace for all data within the hybrid model may be generated as well. See FIGS. 12 and 13 and the related discussion for using convolutional modeling to produce the synthetic seismic trace from reflection coefficients and a wavelet. For example, the reflection coefficient pulses shown in FIG. 12 may be modeled through convolution in either the time domain or frequency domain depending on the data sampling of either the geological data or seismic data. The wavelet used in convolutional modeling in step 1040 may be a user-supplied wavelet, a predetermined one for use with the hybrid model, or any other applicable wavelet. Further, in this step, noise may be added to seismic traces as well in order to simulate real world conditions.

At step 1050, a synthetic seismic sub-volume data set is computed which includes synthetic seismic traces for all trace locations and slices in the seismic sub-volume 825. Steps 1020 to step 1040 may be repeated for each individual trace location in the seismic sub-volume 825 and then combined into a single data set. In some implementations, less than all trace locations may be included in this computation.

At step 1060, the synthetic seismic traces in the synthetic seismic sub-volume data set are validated. For example, individual traces from the synthetic seismic sub-volume may be compared and contrasted with actual recorded seismic survey data corresponding to trace locations for the individual traces. If the synthetic traces and the actual traces are sufficiently similar, the geological model 500 and hybrid elastic property model 600 are accurate. Additionally, the synthetic data set as a whole may be analyzed and examined for geological structures and stratigraphic features that do not properly align with the recorded survey data. Validation may also include pinpointing cells or voxels in the hybrid elastic property model 600 that have inaccurate information.

Figure 11:
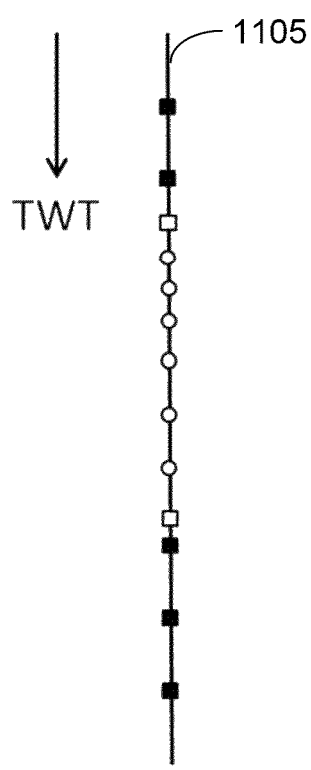
FIG. 11 illustrates reflection interfaces along a path in accordance with implementations of various technologies described herein.
Figure 12:
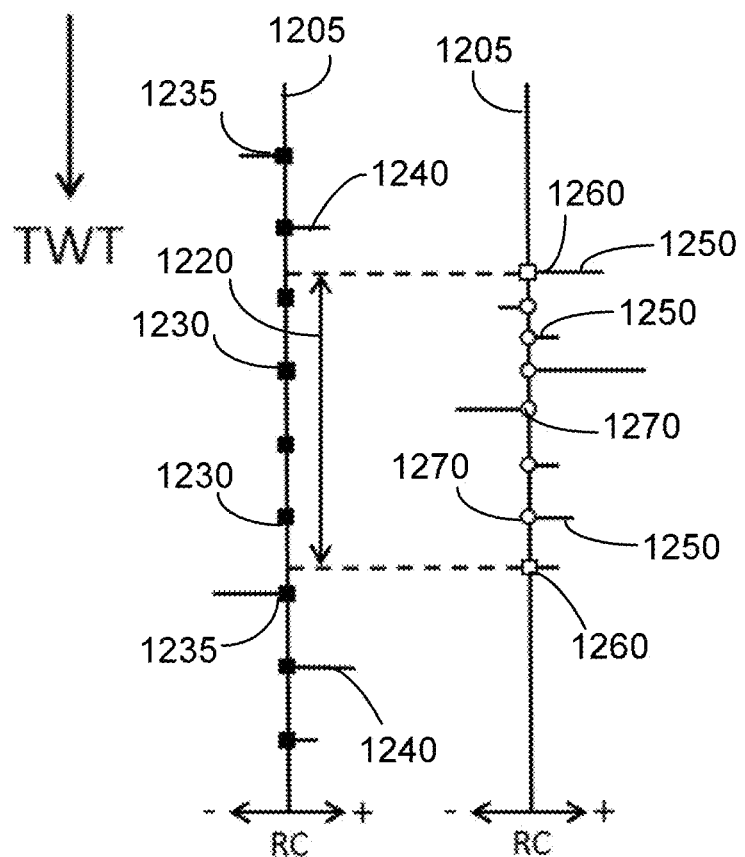
FIG. 12 illustrates a reflection coefficient series corresponding to reflection interfaces for a path in accordance with implementations of various technologies described herein.

FIG. 11 illustrates reflection interface positions along a path 1105 for the trace location T2 in accordance with implementations of various technologies described herein. The path 1105 follows the route of the path 820 in FIG. 8. FIG. 11 corresponds to the result of step 1020 from FIG. 10. A reflection interface position is where two cells meet along a path. The position of reflection interfaces may vary depending on whether you are using cells from the seismic volume 400 or the geological model 500. Black squares represent reflection interfaces outside the geological zone of interest. Unfilled circles represent reflection interfaces inside the geological zone of interest. Unfilled boxes represent reflection interfaces at the borders of the geological zone of interest FIG. 12 illustrates a reflection coefficient series corresponding to reflection interfaces for a path in accordance with implementations of various technologies described herein. FIG. 12 corresponds to the result of step 1030 from FIG. 10. In particular, FIG. 12 shows reflection coefficient (RC) amplitudes through positive and negative pulses at reflection interfaces for both the seismic volume 400 and the geological model 500. On the left, a path 1205 for reflection interfaces in the seismic volume 400 is shown. On the right, the same path 1205 for reflection interfaces in the geological model 500 is shown. The path 1205 follows the route of the path 820 in FIG. 8. Reflection coefficients for a reflection coefficient series can be positive or negative depending on the elastic property information. A negative reflection coefficient corresponds to a 180 degree phase shift.

The two-way arrow shows a geological zone of interest 1220 that corresponds to the geological model 500 data that overlaps the seismic volume 400 data. Outside the geological zone of interest 1220, black squares 1235 with pulse bars 1240 represent reflection coefficient intensities at that particular reflection interface. Because black squares 1235 utilize data from cells in the seismic volume 400, the corresponding reflection coefficients may have regular spacing. Inside the geological zone of interest 1220, black squares 1230 without pulse bars are reflection coefficients obtained from the seismic volume 400 data, but which have a corresponding geological model-based reflection coefficient. As such, the reflection coefficients of black squares 1230 inside the geological zone of interest 1220 are not used in synthesizing seismic traces. The pulse bars 1250 attached to unfilled squares 1260 and unfilled circles 1270 represent reflection coefficients based on the geological model data and take priority over reflection coefficients based on the seismic volume 400 data. For a detailed discussion and method demonstrating how priority works, see FIGS. 9A-9B. These unfilled squares 1260 and unfilled circles 1250 have irregular spacing, because they are based on the geological model's 500 cells.

The reflection coefficients corresponding to the pulse bars are calculated from various formulae using elastic property information. Examples include Zoeppritz equations, or Aki & Richards, Shuey, Fatti, Verm & Hilterman approximations, or some combination thereof.

Figure 13:
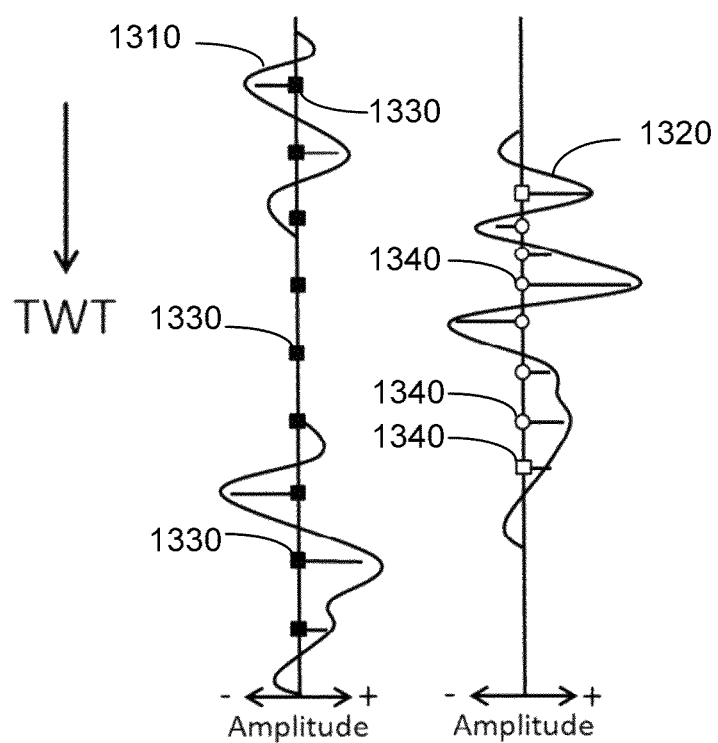
FIG. 13 illustrates output synthetic seismic traces resulting from convolutional modeling reflection coefficient series with a wavelet in accordance with implementations of various technologies described herein.

FIG. 13 illustrates output synthetic seismic traces resulting from convolutional modeling a reflection coefficient series with a wavelet in accordance with implementations of various technologies described herein. FIG. 13 corresponds to step 1040 from FIG. 10. To perform seismic trace synthesis, equation 1 may be used. The wavelet, w(t) for equation 1 may be a user-supplied wavelet or a predetermined one for use in the HEPM 600. For instance, a wavelet w(t) may be a band-limited filter, and the user may specify amplitude, frequency, and phase of the wavelet. The effect of the wavelet on the reflection coefficients through convolution may be to blur out the reflection impulses into a smooth amplitude trace, as illustrated in FIG. 13. The user-supplied wavelet for synthesizing seismic traces may be a wavelet obtained through seismic wavelet extraction from recorded data.

As shown in FIG. 13, the left seismic trace 1310 is the result of modeling a wavelet with a reflection coefficients series 1330 from the seismic volume 400 data, while the right seismic trace 1320 is the result of modeling the same wavelet with a reflection coefficient series 1340 from the geological model 500 data.

Convolutional modeling may be performed separately on the reflection coefficients using the seismic volume 400 data and the geological model 500 data. For the seismic volume-based reflection coefficient series 1330, convolution may be done in the frequency domain in order to take advantage of the data's regular sampling. For the geological model-based reflection coefficient series 1340, a time domain approach may be used for convolutional modeling.

Figure 14:
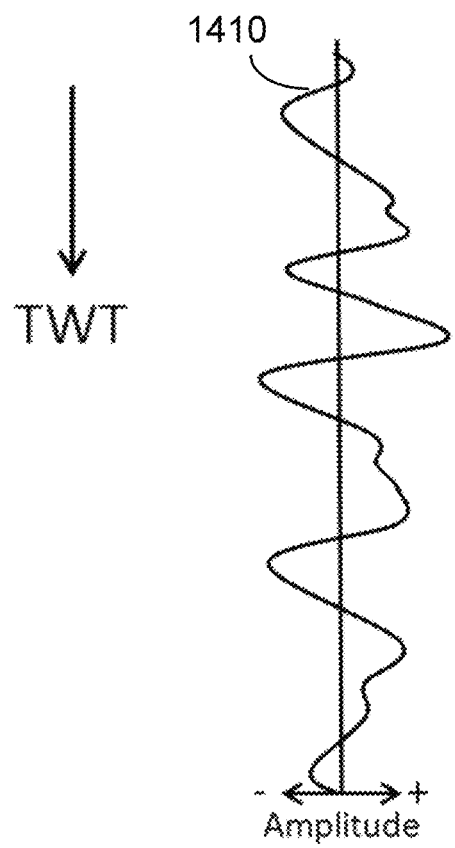
FIG. 14 illustrates an output synthetic seismic trace in accordance with implementations of various technologies described herein.

FIG. 14 illustrates an output synthetic seismic trace 1410 in accordance with implementations of various technologies described herein. FIG. 14 corresponds to the result of step 1040 from FIG. 10. In one implementation, the two different output seismic traces shown in FIG. 13 can be summed to produce the corresponding output synthetic amplitude trace 1410 in the seismic sub-volume 825.

The previous implementations and methods may be used for synthesizing 4D or time lapse data. In a 4D model, synthetic seismic traces are computed for different times. For instance, the hybrid elastic property model 600 may utilize dynamic property data where each voxel contains elastic property information for a physical region at different times.

In analyzing 4D data, a baseline synthetic seismic trace may be calculated that represents a reservoir before any oil, gas or other mineral or substances are extracted from the reservoir. Further synthetic data sets may then be produced representing the progressive effect of extracting, for example, oil from the reservoir. If we compute synthetic seismic traces for time A and time B and subtract them, a synthetic difference volume may be computed. The synthetic difference volume is the effect of changing the synthetic difference model over time. For validating 4D synthetic data, the synthetic differences may be compared with the actual measured differences. If the differences between volumes are the same, then the applicable geological model may be accurate.

For synthetic seismic traces at different times, such as time A and time B, the geological model 500 may need to be updated to reflect the physical changes beneath the subsurface. This may include having two hybrid model data sets or updating a previous hybrid model data set with time lapse data. For instance, flow software may be utilized to produce a flow model showing how the distribution of oil, water and pressure change in a reservoir over time. This flow model may then be converted to elastic property information for use in the hybrid elastic property model 600.

Computer System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Such modules may include a plug-in for a geoscientific software, e.g., Petrel®. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software or both.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 15:
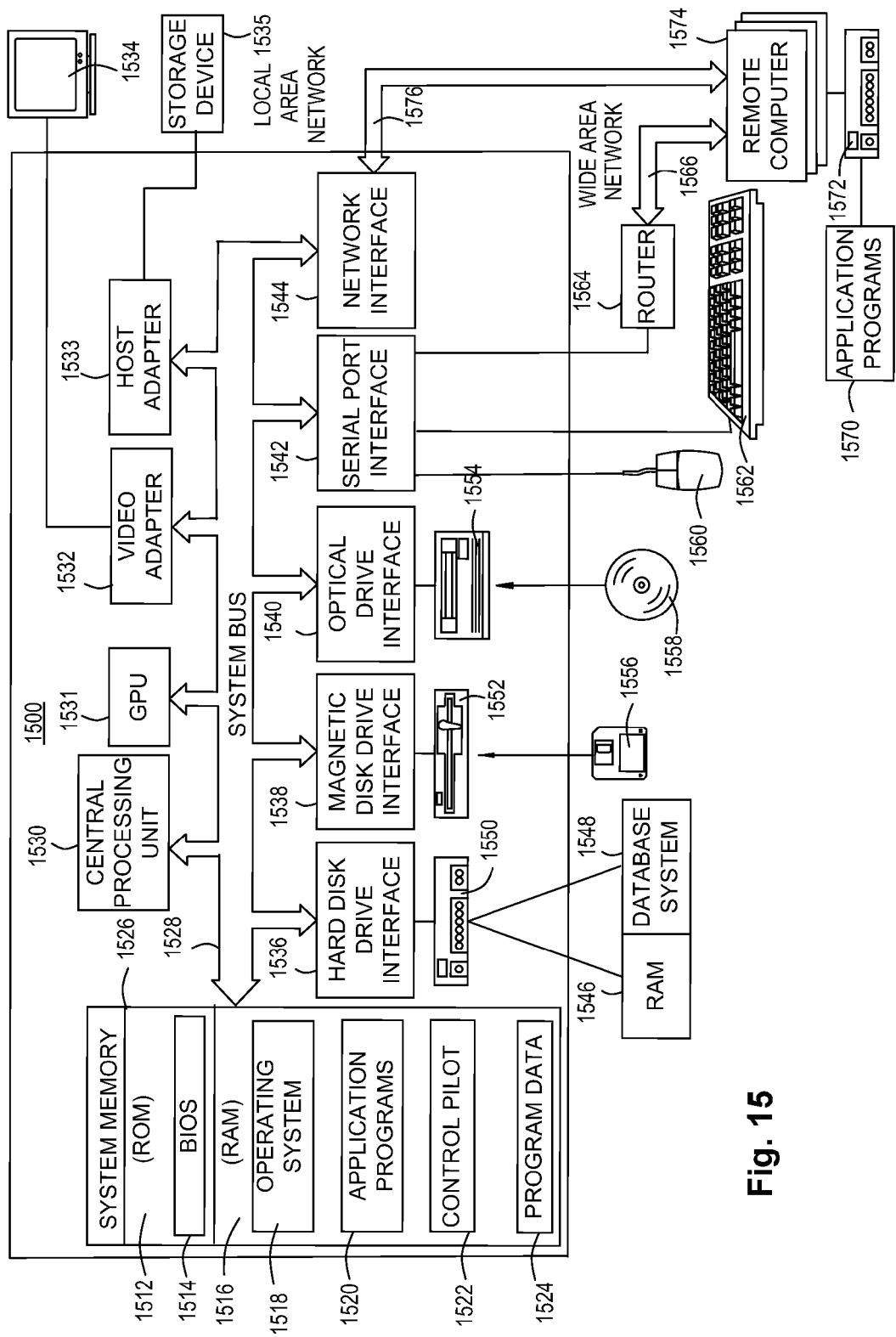
FIG. 15 illustrates a schematic diagram of a computing system in which the various technologies described herein may be incorporated and practiced.

FIG. 15 illustrates a schematic diagram of a computing system 1500 in which the various technologies described herein may be incorporated and practiced. Although the computing system 1500 may be a conventional desktop or a server computer, as described above, other computer system configurations may be used.

The computing system 1500 may include a central processing unit (CPU) 1530, a system memory 1526, a graphics processing unit (GPU) 1531 and a system bus 1528 that couples various system components including the system memory 1526 to the CPU 1530. Although only one CPU is illustrated in FIG. 15, it should be understood that in some implementations the computing system 1500 may include more than one CPU. The GPU 1531 may be a microprocessor specifically designed to manipulate and implement computer graphics. The CPU 1530 may offload work to the GPU 1531. The GPU 1531 may have its own graphics memory, and/or may have access to a portion of the system memory 1526. As with the CPU 1530, the GPU 1531 may include one or more processing units, and each processing unit may include one or more cores. The system bus 1528 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 1526 may include a read-only memory (ROM) 1512 and a random access memory (RAM) 1546. A basic input/output system (BIOS) 1514, containing the basic routines that help transfer information between elements within the computing system 1500, such as during start-up, may be stored in the ROM 1515.

The computing system 1500 may further include a hard disk drive 1550 for reading from and writing to a hard disk, a magnetic disk drive 1552 for reading from and writing to a removable magnetic disk 1556, and an optical disk drive 1554 for reading from and writing to a removable optical disk 1558, such as a CD ROM or other optical media. The hard disk drive 1550, the magnetic disk drive 1552 and the optical disk drive 1554 may be connected to the system bus 1528 by a hard disk drive interface 1536, a magnetic disk drive interface 1538 and an optical drive interface 1540, respectively. The drives and their associated computer-readable media may provide non-volatile storage of computer-readable instructions, data structures, program modules and other data for the computing system 1500.

Although the computing system 1500 is described herein as having a hard disk, a removable magnetic disk 1556 and a removable optical disk 1558, it should be appreciated by those skilled in the art that the computing system 1500 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 1500. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 1500 may also include a host adapter 1533 that connects to a storage device 1535 via a small computer system interface (SCSI) bus, a Fiber Channel bus, an eSATA bus or using any other applicable computer bus interface. Combinations of any of the above may also be included within the scope of computer readable media.

A number of program modules may be stored on the hard disk 1550, magnetic disk 1556, optical disk 1558, ROM 1512 or RAM 1516, including an operating system 1518, one or more application programs 1515, control pilot 1522, program data 1524 and a database system 1548. The application programs 1515 may include various mobile applications ("apps") and other applications configured to perform various methods and techniques described herein. The operating system 1518 may be any suitable operating system that may control the operation of a networked personal or server computer, such as Windows® XP, Mac OS® X, Unix-variants (e.g., Linux® and BSD®), and the like. For the seismic volume 400, the geological model 500, and the hybrid elastic property model 600, data for all three models may be included together in computer readable storage media without having to import or export data to various systems or the application programs 1515.

A user may enter commands and information into the computing system 1500 through input devices such as a keyboard 1562 and pointing device 1560. Other input devices may include a microphone, joystick, game pad, satellite dish, scanner or the like. These and other input devices may be connected to the CPU 1530 through a serial port interface 1542 coupled to system bus 1528, but may be connected by other interfaces, such as a parallel port, game port or a universal serial bus (USB). A monitor 1534 or other type of display device may also be connected to system bus 1528 via an interface, such as a video adapter 1532. In addition to the monitor 1534, the computing system 1500 may further include other peripheral output devices such as speakers and printers.

Further, the computing system 1500 may operate in a networked environment using logical connections to one or more remote computers 1574. The logical connections may be any connection that is commonplace in offices, enterprise-wide computer networks, intranets, and the Internet, such as local area network (LAN) 1576 and a wide area network (WAN) 1566. The remote computers 1574 may be another a computer, a server computer, a router, a network PC, a peer device or other common network node, and may include many or all of the elements describes above relative to the computing system 1500. The remote computers 1574 may also each include application programs 1515 similar to that of the computer action function.

When using a LAN networking environment, the computing system 1500 may be connected to the local network 1576 through a network interface or adapter 1544. When used in a WAN networking environment, the computing system 1500 may include a modem 1564, wireless router or other means for establishing communication over a wide area network 1566, such as the Internet. The modem 1564, which may be internal or external, may be connected to the system bus 1528 via the serial port interface 1542. In a networked environment, program modules depicted relative to the computing system 1500, or portions thereof, may be stored in a remote memory storage device 1572. It will be appreciated that the network connections shown are merely examples and other means of establishing a communications link between the computers may be used.

The network interface 1544 may also utilize remote access technologies (e.g., Remote Access Service (RAS), Virtual Private Networking (VPN), Secure Socket Layer (SSL), Layer 2 Tunneling (L2T) or any other suitable protocol). These remote access technologies may be implemented in connection with the remote computers 1574.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, partly on the user's computing device, as a stand-alone software package, partly on the user's computer and partly on a remote computer or entirely on the remote computer or a server computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for fine tuning one or more seismic surveys, the method comprising:

receiving a hybrid model comprising geological data and seismic data, wherein the geological data corresponds to a zone of interest, wherein the seismic data corresponds to the zone of interest and areas adjacent to the zone of interest and wherein the seismic data were acquired using seismic sensors during a seismic survey;

determining, using at least one microprocessor, a plurality of reflection properties along a path for a trace location using data from the hybrid model;

generating, using the at least one microprocessor, a synthetic seismic trace for the trace location using the plurality of reflection properties, wherein the synthetic seismic trace corresponds to a response of seismic waves within the earth's subsurface; and using the synthetic seismic trace to fine tune the seismic survey.

2. The method of claim 1, wherein the seismic data comprises regularly sampled data and the geological data comprises irregularly sampled data.

3. The method of claim 1, wherein the hybrid model comprises elastic property values of physical media in the zone of interest and in the adjacent areas of the zone of interest.

4. The method of claim 1, wherein the geological data comprises structural and stratigraphic features of the zone of interest.

5. The method of claim 1, wherein the seismic data comprises recorded seismic survey data, synthetic seismic data, data derived from the recorded seismic survey data, or combinations thereof.

6. The method of claim 1, wherein the path for the trace location is based on a predetermined angle of incidence at which a seismic wave approaches a reflection interface along the path.

7. The method of claim 1, further comprising validating the synthetic seismic trace with recorded seismic survey data for the trace location.

8. The method of claim 1, wherein determining the plurality of reflection properties comprises determining a reflection coefficient at a reflection interface using data from the hybrid model.

9. The method of claim 8, wherein the hybrid model comprises elastic property values from the geological data and the seismic data, and wherein determining the reflection coefficient comprises using only the geological data to determine an elastic property value of an interface medium at the reflection interface.

10. The method of claim 8, wherein the geological data takes priority over the seismic data in determining an elastic property of an interface medium at the reflection interface.

11. The method of claim 1, further comprising repeating the determining step and the generating step for a plurality of trace locations to generate a plurality of synthetic seismic traces.

12. The method of claim 11, further comprising validating the plurality of synthetic seismic traces with recorded seismic survey data that correspond to the plurality of trace locations.

13. The method of claim 11, wherein the plurality of trace locations is defined by inline locations, crossline locations, or both.

14. The method of claim 11, wherein the plurality of synthetic seismic traces are defined by a predetermined slice range.

15. The method of claim 1, wherein generating the synthetic seismic trace comprises modeling a portion of the synthetic seismic trace in the time domain by performing a convolution of reflection coefficients based on the geological data with a wavelet.

16. The method of claim 1, wherein generating the synthetic seismic trace further comprises modeling a portion of the synthetic seismic trace in the frequency domain by performing a convolution of reflection coefficients based on the seismic data with a wavelet.

17. A non-transitory computer-readable medium having stored thereon computer-executable instructions for fine tuning one or more seismic surveys which, when executed by a computer, cause the computer to:
  receive a hybrid model comprising elastic property values of physical media obtained from geological data and seismic data, wherein the geological data corresponds to a zone of interest, wherein the seismic data corresponds to the zone of interest and adjacent areas of the zone of interest and wherein the seismic data were acquired using seismic sensors during a seismic survey;
  determine, using at least one microprocessor a plurality of reflection properties along a path for a trace location using data from the hybrid model;
  generate, using the at least one microprocessor, a synthetic seismic trace for the trace location using the plurality of reflection coefficients, wherein the synthetic seismic trace corresponds to a response of seismic waves within the earth's subsurface; and
  using the synthetic seismic trace to fine tune the seismic survey.

18. The non-transitory computer-readable medium of claim 17, having stored thereon computer-executable instructions which, when executed by the computer, cause the computer to:
  validate the synthetic seismic trace with recorded seismic survey data for the trace location.

19. The non-transitory computer-readable medium of claim 17, wherein the elastic property values obtained from geological data take priority over the elastic property values obtained from seismic data in determining the plurality of reflection coefficients.

20. The method of claim 1, wherein the path for the trace location comprises a plurality of locations where the path meets a reflection interface, and wherein the reflection interface is a border between adjacent cells in the hybrid model.

21. A computer-implemented method for fine tuning one or more seismic surveys, the method comprising:
  receiving a first hybrid model comprising a first set of geological data and a first set of seismic data, wherein the first set of geological data corresponds to a zone of interest, wherein the first set of seismic data corresponds to the zone of interest and adjacent areas of the zone of interest and wherein the seismic data were acquired using seismic sensors during a seismic survey;
  receiving a second hybrid model comprising a second set of geological data and a second set of seismic data, wherein the second set of geological data corresponds to the zone of interest, wherein the second set of seismic data corresponds to the zone of interest and the adjacent areas of the zone of interest, wherein at least one of the second set of geological data is time-lapse data of the first set of geological data and the second set of seismic data is time-lapse data of the first set of seismic data and wherein the seismic data has been acquired using seismic sensors during a seismic survey;
  determining, using at least one microprocessor, a first plurality of reflection properties along a first path for a trace location using data from the first hybrid model;
  determining, using the at least one microprocessor, a second plurality of reflection properties along a second path for the trace location using data from the second hybrid model;
  generating, using the at least one microprocessor, a first synthetic seismic trace for the trace location using the first plurality of reflection properties;
  generating, using the at least one microprocessor, a second synthetic seismic trace for the trace location using the second plurality of reflection properties;
  determining the difference between the first synthetic seismic trace and the second synthetic seismic trace; and
  using the synthetic seismic trace to fine tune the seismic survey.

\* \* \* \* \*